United States Patent [19]

Drucker

[11] Patent Number: 4,831,275
[45] Date of Patent: May 16, 1989

[54] METHOD AND MEANS FOR SELF-REFERENCING AND SELF-FOCUSING A BAR-CODE READER

[75] Inventor: Steven H. Drucker, Oakland, Calif.

[73] Assignee: Quential, Inc., Berkeley, Calif.

[21] Appl. No.: 930,328

[22] Filed: Nov. 12, 1986

[51] Int. Cl.$^4$ .............................................. G06K 7/14
[52] U.S. Cl. .................................... 250/566; 235/462; 235/472
[58] Field of Search ............... 250/234, 568, 201, 204, 250/566; 235/462, 463, 472

[56] References Cited

U.S. PATENT DOCUMENTS

| | | |
|---|---|---|
| 3,663,803 | 5/1972 | Mohan et al. . |
| 3,669,312 | 10/1972 | Jones et al. . |
| 3,700,858 | 10/1972 | Murthy . |
| 3,701,097 | 10/1972 | Wolff . |
| 3,723,710 | 3/1973 | Crouse et al. . |
| 3,731,064 | 5/1973 | Berler et al. . |
| 3,778,597 | 12/1973 | Vanderpool et al. . |
| 3,792,235 | 2/1974 | Durante et al. . |
| 3,849,632 | 11/1974 | Eckert, Jr. et al. . |
| 3,864,548 | 2/1975 | O'Neill, Jr. et al. . |
| 3,882,464 | 5/1975 | Zamkow . |
| 3,891,831 | 6/1975 | Coles, Jr. . |
| 3,893,077 | 7/1975 | Myren . |
| 3,925,639 | 12/1975 | Hester . |
| 3,927,303 | 12/1975 | Wefers et al. . |
| 3,985,999 | 10/1976 | Yoneyama . |
| 3,991,299 | 11/1976 | Chadima . |
| 4,000,397 | 12/1976 | Hebert et al. . |
| 4,004,131 | 1/1977 | O'Neill, Jr. et al. . |
| 4,034,230 | 7/1977 | Brill et al. . |
| 4,044,227 | 8/1977 | Holm et al. . |
| 4,074,114 | 2/1978 | Dobras . |
| 4,135,663 | 1/1979 | Nojiri et al. . |
| 4,136,821 | 1/1979 | Sugiura et al. ...................... 235/462 |
| 4,146,046 | 3/1979 | Dobras . |
| 4,146,782 | 3/1979 | Barnich . |
| 4,147,295 | 4/1979 | Nojiri et al. . |
| 4,160,156 | 7/1979 | Sherer . |
| 4,175,693 | 11/1979 | Nakanishi et al. . |
| 4,219,152 | 8/1980 | Couch et al. . |
| 4,245,152 | 1/1981 | Flurry et al. . |
| 4,272,675 | 6/1981 | Blanford et al. . |
| 4,289,959 | 9/1981 | Takayama et al. ................. 250/201 |
| 4,411,016 | 10/1983 | Wakeland . |
| 4,458,145 | 7/1984 | Voles ................................... 250/204 |
| 4,517,455 | 5/1985 | Benitez et al. . |
| 4,528,443 | 7/1985 | Smith . |
| 4,578,570 | 3/1986 | Mazumder et al. . |
| 4,613,759 | 9/1986 | Frohbach . |
| 4,652,731 | 3/1987 | Chautemps et al. . |

Primary Examiner—Edward P. Westin
Attorney, Agent, or Firm—A. C. Smith

[57] ABSTRACT

A scanning device and method for reading bar-code or other contrasting marks from a surface at variable distance from the scanning device operates by modulating the focal point of the optical system to yield pulse responses on detected code bars while in focus, and average background response levels from the bar-code surface while out of focus. Modulation of focal point of the optical system is achieved in selected ways such as by positioning optical elements using piezoelectric or electromagnetic drivers or liquid-crystal elements, or by staggering the positions along an optical axis of arrays of optical sensors, or of optical fibers coupled to the sensors.

14 Claims, 5 Drawing Sheets

POSITION 1 = NEAR FOCUS
POSITION 2 = MID FOCUS
POSITION 3 = FAR FOCUS

METHOD AND MEANS FOR SELF-REFERENCING AND SELF-FOCUSING A BAR-CODE READER

BACKGROUND AND SUMMARY OF THE INVENTION

Certain known bar-code readers rely upon optical sensors which are located a fixed focal length away from the bar code being detected. This may be accomplished by operating a bar-code transducer in contact with the surface upon which the bar code is printed. In other bar code readers, collimated light from a laser is used to scan a bar code on or near a plane of detection. In these and other conventional bar-code readers the object bearing the bar code being detected is usually referenced at a fixed focal distance from the detector in order to pick up a sharp, optical reproduction of an image of the bar code. Also, known bar-code readers commonly require normalizing schemes to assure proper sensing of bar codes that are printed on materials of different background colors and textures, and that are to be detected under varying ambient lighting conditions.

In accordance with the present invention, an improved method and means of operating an optical sensor facilitates the scanning and detection of a bar code located at a random focal distance from the sensor, and under varying lighting and background conditions. Specifically, the effective focal position of an optical system for the present bar code reader is modulated over a selected range of distances to provide both effective background reference conditions and a sharp image of the bar code on the optical detector. Several schemes are provided for modulating the effective focal distance of the optics, and the associated circuitry converts the sensed images to digital signals representative of the detected bar code.

DESCRIPTION OF THE PREFERRED EMBODIMENT

Figure 1:
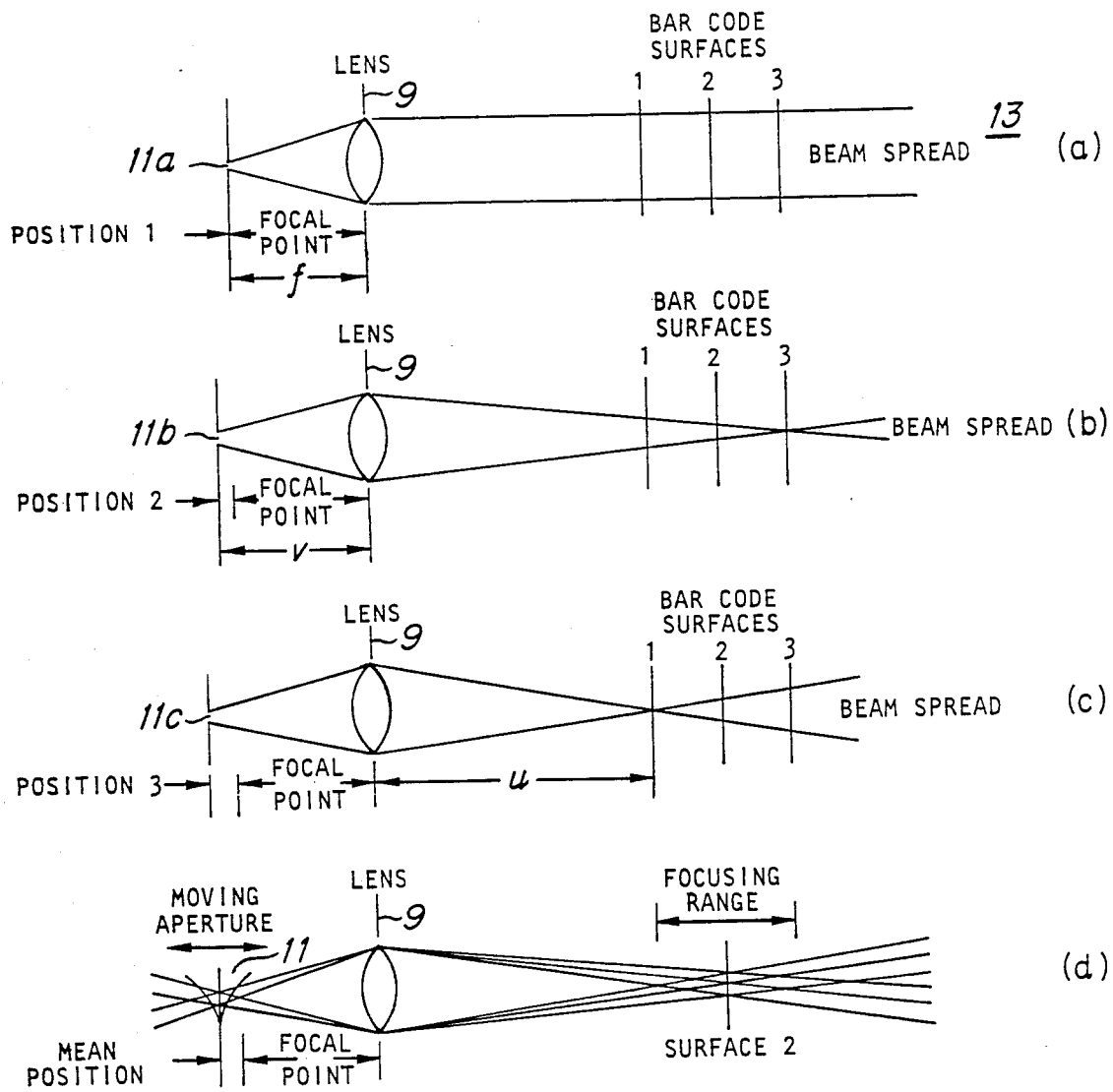
FIGS. 1(a)–(d) are pictorial schematic diagrams which illustrate the features of the present invention.

Referring now to FIGS. 1(a)–(d), there are shown pictorial diagrams of the optical system of the bar code reader which illustrates several aspects of the present invention. The convex lens 9 has a selected focal length (f) which is a function of the ratio of curvatures of its faces. The simplified formula relating focal length (f) and distance (u) from lens 9 to an object, and distance (v) from lens 9 to the image, is:

$$\frac{1}{f} = \frac{1}{u} + \frac{1}{v} \qquad \text{Eq. (1)}$$

Thus, for a fixed-focal length of the lens 9 and an aperture 11 located at the image plane, the object distance (u) is governed by the formula:

$$\frac{1}{u} = \frac{1}{f} - \frac{1}{v} ; \qquad \text{Eq. (2)}$$

$$\frac{1}{u} = \frac{v}{vf} - \frac{f}{vf} = \frac{v-f}{vf} \qquad \text{Eq. (3)}$$

$$u = \frac{vf}{v-f} \qquad \text{Eq. (4)}$$

Thus, if the aperture 11(a) is placed at the focal point of the lens, V=F and the object is effectively at infinity 13, as illustrated in FIG. 1(a). An optical sensor located at the focal point will respond to the average ambient surface brightness of a bar code pattern on a surface 1, 2 or 3 located at any distance from the lens 9.

If an optical element such as an aperture, or mirror, or sensor is spaced (11b) away from the lens 9 on its image side beyond the focal length (f), the associated object distance or focal distance moves closer to the lens 9 from infinity, as illustrated in FIG. 1(b). Thus, a bar code pattern located at this focal distance 3 is in focus, but a bar code pattern located at 1 or 2 intermediate to the spacing between lens 9 and location 3 is out of focus, but is sensed at aperture location 11b as the average surface brightness of dark and light portions of the bar code pattern on the surface lying within the field of view of the lens 9. Thus, an optical sensor that is operated at location 11b is able to focus upon and distinguish specific bars and spaces in a bar code pattern at location 3 and is able to detect the average surface brightness of a bar code pattern at location 1 or 2. Similarly, if an optical sensor is spaced (11c) further away from lens 9 on its image side, as illustrated in FIG. 1(c), the focal distance (u) moves closer to lens 9 to location 1, and bar code patterns at location 2 or 3 are out of focus. Thus, by effectively moving an optical element such as an aperture or mirror or sensor between locations 11a and 11c (i.e. at the focal point and at a location beyond the focal point), the distance from the lens at which an object is in focus varies over a broad range. Thus, an optical sensor of a conventional type that produces an electrical signal representative of incident light, and that is effectively moved back and forth between locations 11a and 11c from a median position 11b, as illustrated in FIG. 1(d), produces a series of wave forms, as illustrated in FIG. 2, under the various operating conditions specified. Similar responses are possible by moving an aperture 11 or mirror back and forth along the optical axis of the lens 9, as illustrated in FIG. 1(d).

In each of the embodiments of the present invention, it should be noted that the image which is projected onto the sensor at the focal point must be the size of the object (i.e., the code bar) that is being detected or distinguished against background. The largest dimension of the active region of a sensor is selected to be approximately the same order of magnitude as the image of the code bar being detected. Thus, as a white code bar comes into focus, the sensor produces a peak of response, as illustrated in FIG. 2, only from the image of the white code bar, to the exclusion of surrounding objects whose images are outside the active region of the sensor. Of course, a similar response can be achieved by selecting an aperture 11 (or mirror) having an image-transmitting (or image-reflecting) area with a maximum dimension that is of the same order of magnitude as the image size of the code bar being detected or distinguished against the background of surrounding objects. The sensor therefore produces an average level response, as illustrated in FIG. 2, to the average surface brightness detected when the image is enlarged, by re-positioning the sensor (or aperture or mirror) relative to the focal length, to include a large sample of the background surroundings.

Figure 2:
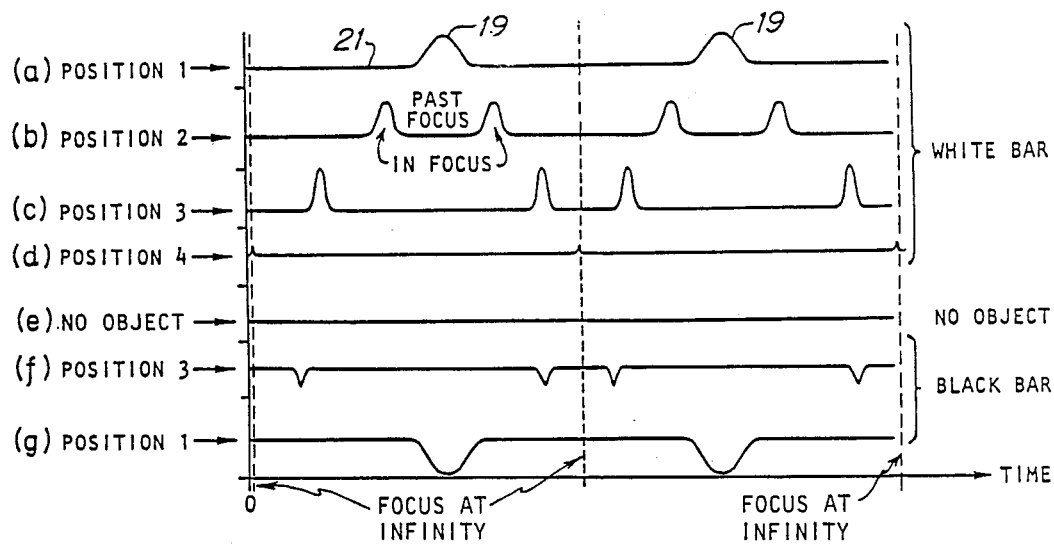
FIG. 2 is a graph illustrating various waveforms associated with operations of the embodiments of the present invention.

Referring now to FIG. 2, there is shown a graph of light intensity (and, hence, of electrical signal amplitude) versus time (or position) on an optical sensor that is effectively moved back and forth between locations 11a and 11c of FIG. 1(d). Specifically, FIG. 2(a) illustrates a peak response 19 attributable to detection of a white or reflective object located at the focal distance from the lens 9 and the base or reference-level response 21 that is attributable to detection of the average surface brightness of the object i.e. code bars and background fields in the field of view of the lens 9. FIGS. 2(b), (c) and (d) illustrate simplified responses attributable to detection of a white or reflective object at locations spaced at various distances between nearest focus and farthest focus (i.e., near infinity) from the lens 9 of FIG. 1.

FIG. 2(e) represents the average response of an optical sensor to the field of view through lens 9, with no object or bar code present in the field of view. FIGS. 2(f) and (g) illustrate responses of an optical sensor to a black object (e.g. a code bar) spaced, respectively, near farthest focus (near infinity) and nearest focus of the lens 9. Therefore, an optical sensor produces positive or negative pulses of response relative to an average background intensity as white or black code bars are sensed as the focal distances are modulated over a range of distances in front of the lens 9. It should be noted that the width and amplitude of the pulse responses decrease with distance from the lens as the code bars constitute progressively smaller signal content against field-of-view background as focal distance in front of the lens 9 increases. Of course, this same varying double-pulse spacing with distance may be utilized for distance measurements using the apparatus of the present invention to modulate the focal distance of an optical system.

Figure 3A:
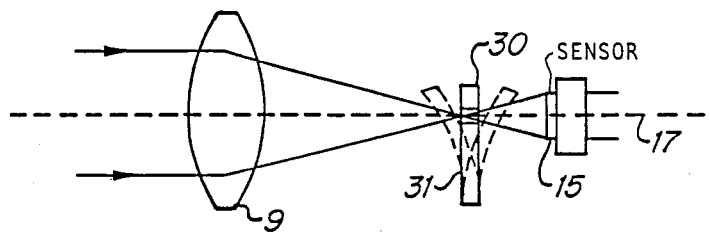
FIG. 3(a) is a pictorial diagram of an embodiment of the present invention in which an optical aperture is variably located along the optical axis.
Figure 3B:
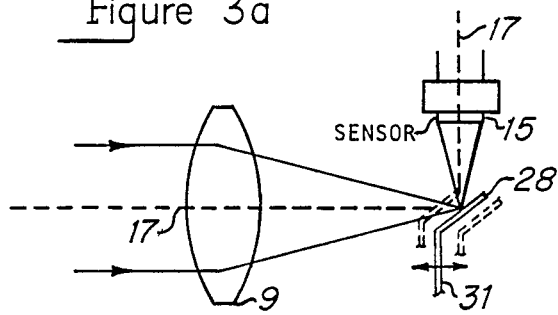
FIG. 3(b) is a pictorial diagram of an embodiment of the present invention in which a mirror is variably located along the optical axis.

Referring now to FIGS. 3(a) and 3(b), there are shown pictorial diagrams of embodiments of the present invention in which an element of the optical system alters the position, along the optical axis 17, of the image distance from a lens. Specifically, in an optical system including the lens 9, a sensor 15 and the aperture 30, the sensor (or a mirror to reflect light to the sensor) or the aperture may be mounted on a movable lever or beam 31. The positional modulation effect with a component of motion oriented along the optical axis 17 may be controlled using a known piezoelectric or electrostatic or electromagnetic device coupled to lever 31 under control of applied electrical signal. Of course, if a mirror 28 is position-modulated along the optical axis 17 as illustrated in FIG. 3(b), the optical sensor 15 is then oriented to receive reflected light from the mirror 28. Alternatively, the lens or the sensor may be mounted directly on the moving beam to move cyclically back and forth along the optical axis 17.

Figure 4:
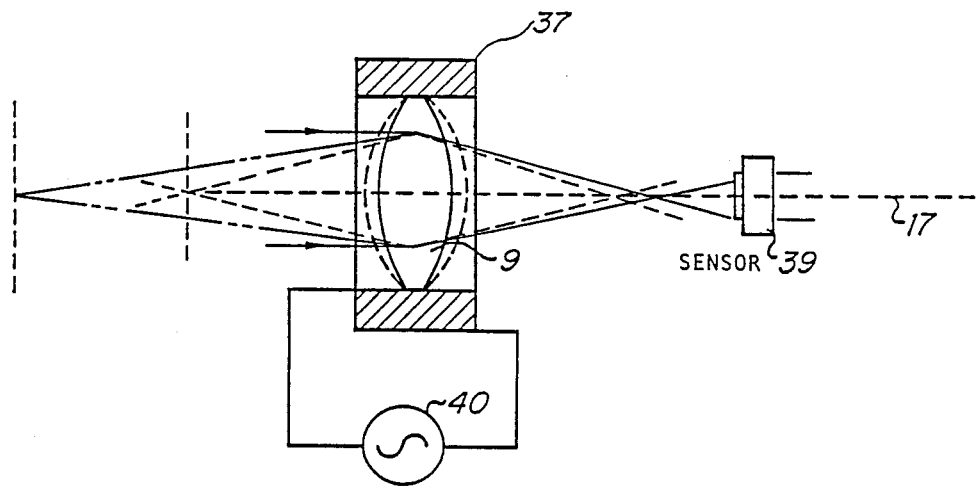
FIG. 4 is a pictorial diagram of an embodiment of the present invention in which the curvature of the lens is varied.

In the embodiment illustrated in FIG. 4, a cylinder 37 of known piezoelectric or magnetic material is snugly fitted around flexible lens 9 to distort or alter lens curvature to change its focal length under the influence of an applied electrical signal of alternating polarity. For an optical sensor 39 in fixed position relative to lens 9, this alteration of the lens 9 corresponds to a cyclic variation of the distance to an in-focus object under control of an applied electrical signal 40.

Figure 5:
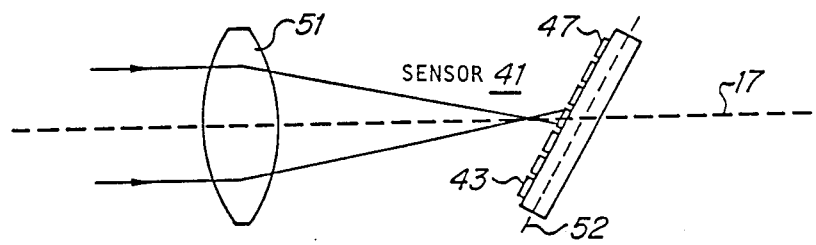
FIG. 5 is a pictorial diagram of an embodiment of the present invention including a spaced array of sensors.

In accordance with a preferred embodiment of the present invention, modulation of the focus distance to an object may also be achieved without physically moving optical elements of the system. Specifically, as illustrated in the pictorial diagram of FIG. 5, a lineally-spaced array of optical sensors 41 are positioned along an axis 52 that is tilted with respect to the optical axis of the lens 17, so that a short optical path is established between a proximate sensor 43 in the array and a near bar-code object, and a long optical path is established between a remote, maximally-spaced sensor 47 in the tilted array and a distant bar-code object. Alternatively, optical fibers having input ends disposed at successive locations along the optical axis, and having output ends aligned with different sensors in the array provides an equivalent range of long and short optical paths. In these embodiments, the plurality of sensors in the array at positions between sensors 43 and 47 are sequentially activated to effectively modulate the in-focus distance between the lens 51 and bar-code objects being sensed. Thus, a black bar-code positioned at the focal distance from the lens 51 will produce a prominent peak response as illustrated in FIG. 2(g) as the array 41 is scanned, and a black bar-code object positioned at a greater distance than the focal distance from lens 51 will produce a double-pulse response as illustrated in FIG. 2(f) as the sensors in array 41 that are positioned to such focal distances are scanned from both directions. Alternatively, the array of sensors may be scanned in only one direction to yield a pulse output in response to scanning through the focal length. Similar output responses are achieved, as illustrated in FIGS. 2(a-d), on white bar-code objects spaced at or away from the focal distance of the lens 51 as the array 41 is scanned.

Figure 6:
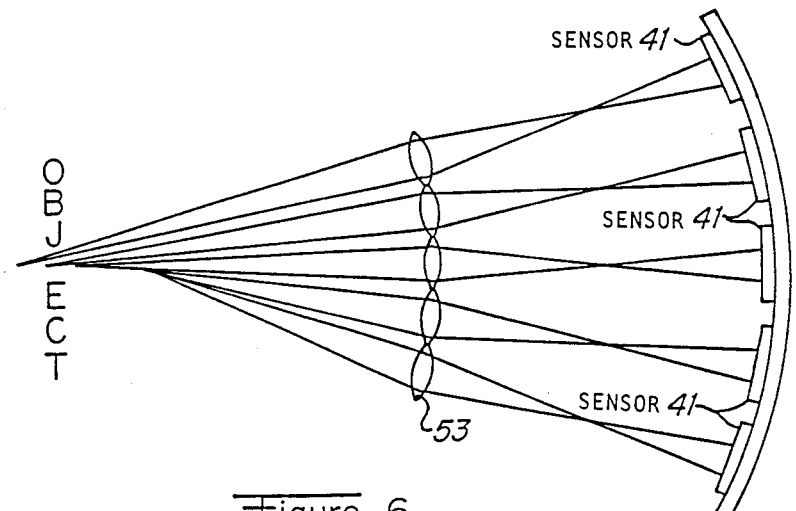
FIG. 6 is a pictorial diagram of an embodiment of the present invention including a lens system of varying focal lengths.

Alternately, as illustrated in FIG. 6, paths of different focal distances can be established through an array of lenses 53 of different focal lengths that are oriented to focus objects at varying distances on selected ones of the sensors 41. Also, the lenses 53 may have the same focal lengths and the sensors 41 may be placed at different image distances from the lenses 53.

Figure 7:
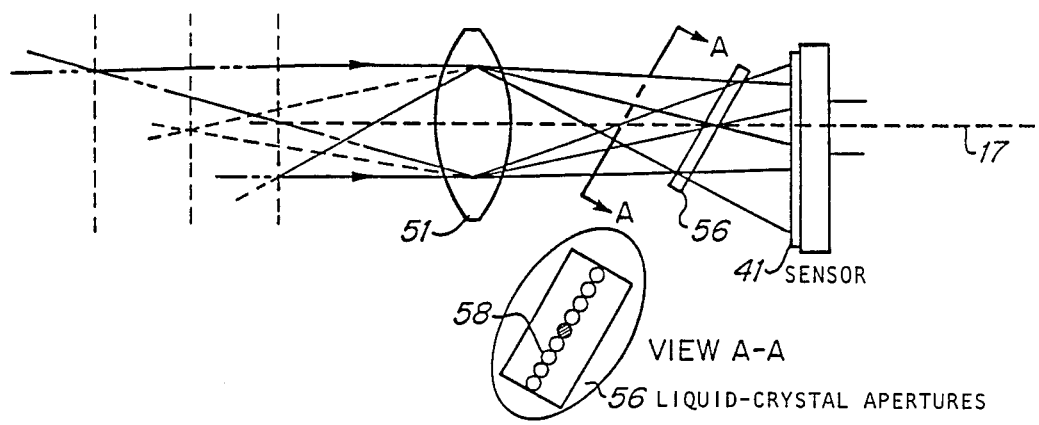
FIG. 7 is a pictorial diagram of an embodiment of the present invention including a spaced array of apertures that are tilted with respect to the optical axis.

In the embodiment of the present invention as illustrated in the pictorial diagram of FIG. 7, an array of electric-field sensitive liquid-crystal apertures 56 is interposed between the lens 51 and sensor 41 in tilted orientation relative to the optical axis 17. As is commonly know, these liquid crystal devices exhibit transparent or opaque optical qualities under control of an applied electric field. Thus, by configuring an array of apertures 56 as shown, selected ones of the apertures may be selectively rendered transparent in sequence under control of an applied electrical signal. By sequentially applying electrical signal to one cell in the array at a time, the location of the aperture 56 may be effectively moved along the optical axis in one direction or in back-and-forth scanning motion to establish different object distances for the in-focus condition.

Figure 8:
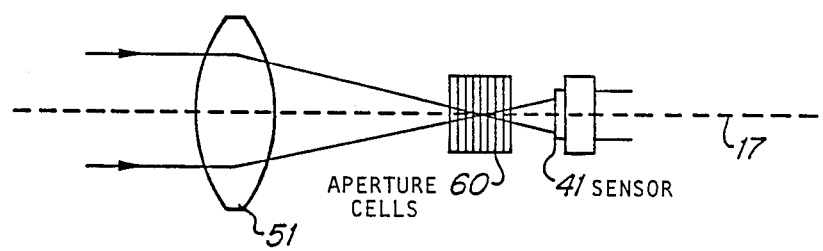
FIG. 8 is a pictorial diagram of an embodiment of the present invention including an array of controllable apertures that are stacked along the optical axis.

Referring now to the illustrated embodiment of FIG. 8, there is shown a pictorial representation of an assembly of optical elements that are arranged to vary periodically the distance to an object in front of lens 51 that is in focus. An array of apertures cells 60 is stacked along the optical axis 17. Each aperture cell includes an active aperture region of selected pattern such as circular or rectangular or elliptical slit in liquid crystal plate that is energized by applied electrical signal in cyclic sequence to form one aperture at a time while the aperture field in all other cells remain transparent. As the distance along the optical axis 17 of the active aperture varies, the distance to the in-focus object in front of lens 51 also varies.

Figure 9:
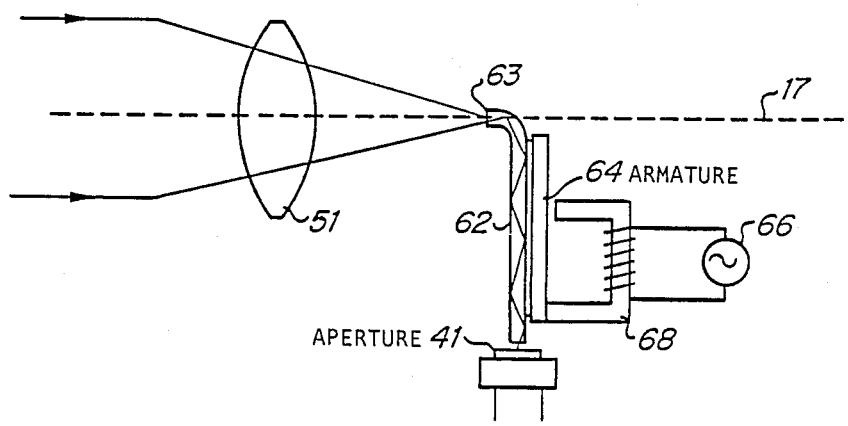
FIG. 9 is an embodiment of the present invention including apparatus for altering the effective position of the sensor along the optical axis.

Referring now to the pictorial diagram of FIG. 9, there is shown an assembly of optical elements that are arranged to vary periodically the focal distance to objects in front of lens 51. The optical sensor 41 receives light from a fiber-optic light pipe 62, the input end 63 of which is attached to an armature 64 that is disposed to move the input end 63 back and forth along optical axis 17. By applying alternating electric signal 66 to an electromagnet 68 or to a piezoelectric device that modulates the position of armature 64 and the input end 63 of the light pipe 62, the distance to the in-focus object in front of lens 51 varies cyclically.

Figure 10:
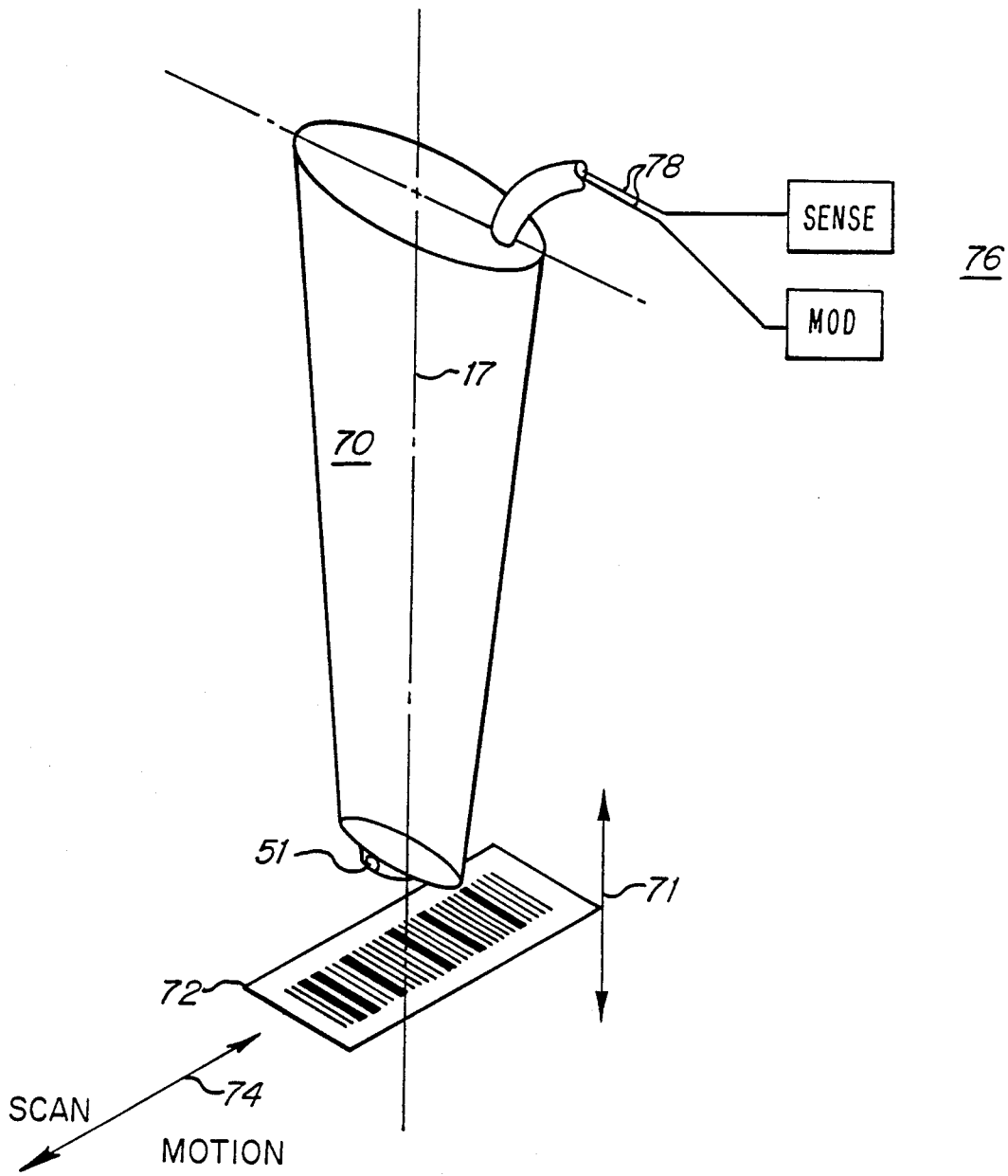
FIG. 10 is a perspective diagram of one embodiment of the bar-code reader according to the present invention.

In each of the above-described embodiments, the distance to an in-focus object (i.e., a bar-code) is varied cyclically between focal distance and a selected distance greater than focal distance in order to provide a peak sensor response as focal distance scans through the actual distance to an object, and to provide average sensor response indicative of the average ambient surface brightness of the object sensed out of focus and within the field of view of the lens. Thus, as illustrated in the perspective view of FIG. 10, there is shown a a bar-code reader 70 which may be disposed at various distances 71, within a limited range, from a bar code 72 to be detected, and which may contain optical elements including lens 51, as previously described. Variations in distance of the lens 51 from the bar code pattern 72 may occur as a result of the bar-code 72 being disposed on a non-planar surface, or may be attributable to tilting of the optical axis 17 of the reader 70 with respect to the axis of relative scan motion 74 as the reader 70 traverses the bar-code pattern 72 under manual or mechanical control. Electrical signals from an optical sensor 41 within the reader 70, and electrical modulating or driving signals, where required, according to the aforementioned and illustrated embodiments are carried between the reader 70 and conventional electrical signal circuitry 76 along the signal conductors 78.

Therefore, the method and means for sensing bar codes according to the present invention provides both background reference detection level from the bar code pattern out of focus as well as peak detection levels on objects (i.e. code bars) in focus as the focal distance of the detection optics are modulated in various ways over a range about the focal length.

I claim:

1. Apparatus for optically sensing contrasting marks disposed along an illuminated surface that is relatively movable with respect to the apparatus and that is positionable at variable distances from the apparatus, the apparatus comprising:
   lens means having an optical axis that is oriented to intersect the surface;
   radiation sensor means positioned substantially along said optical axis for receiving radiation from the surface for producing output signals representative of radiation received thereby, said sensor means including a plurality of individual detectors disposed at various distances from the lens means; and
   circuit means coupled to the sensor means for cyclically actuating the sensor means to respond to radiation reflected from the surface to produce an output that is indicative of the reflected radiation received by the sensor means at distances from such surface that vary cyclically through out-of-focus and in-focus distances for producing representations of the contrasting marks sensed in succession along the surface.

2. Apparatus as in claim 1 wherein said circuit means cyclically actuates said detectors to respond to radiation from the surface at effectively varying distances including the focus distance of the surface from the lens means.

3. Apparatus as in claim 2 wherein said plurality of individual detectors is disposed in a linear array along an axis that is tilted relative to the optical axis for positioning such detectors at various distances from the lens means; and
   said circuit means cyclically actuates each of said detectors to respond to radiation reflected either substantially in focus or out of focus from the surface positioned at each distance from the lens means.

4. A method of sensing a bar code on a illuminated surface at varying distances therefrom, the method comprising the steps of:
   sensing the radiation reflected from the surface at distances which cyclically vary through focus and non-focus distances to produce an output indication of the relative levels of radiation reflected from the surface and sensed at the different distances; and
   producing an output representative of the bar code being sensed in response to the sensed radiation reflected from the surface varying from the level sensed at non-focus distances to the level sensed at the focus distance.

5. The method according to claim 4 wherein in the step of sensing, the radiation reflected from the surface is sensed at successive locations therealong which are oriented in a direction substantially normal to the direction of the distance to the surface; and
   wherein the cyclic variation of distances recurs at a rate faster than the rate of change of successive locations along the surface.

6. The method according to claim 4 wherein in the step of sensing, the radiation reflected from the surface is sensed within a selected field of view which is oriented in alignment with an optical axis which is substantially fixed relative to the surface as the distance to the surface varies through the focus distance.

7. The method according to claim 4 wherein in the step of producing an output, the level of reflected radiation sensed at the focus distance from the surface is at one of a maximum and minimum level relative to the level of reflected radiation sensed at non-focus distances.

8. Apparatus for optically sensing contrasting marks disposed along an illuminated surface that is relatively movable with respect to the apparatus and that is positioned at variable distances from the apparatus, the apparatus comprising:
lens means having an optical axis that is oriented to intersect the surface;
radiation sensor means positioned substantially along said optical axis for receiving radiation from the surface for producing output signals representative of radiation received thereby;
optical means interposed between said lens means and said radiation sensor means for cyclically altering the operative distance between the radiation sensor means and surface through the focal distance; and
circuit means coupled to the sensor means for selectively responding to radiation reflected from the surface to produce an output indicative of the reflected radiation received by the sensor means whether in focus or out of focus from such surface for producing representations of the contrasting marks sensed in succession along the surface.

9. Apparatus as in claim 8 wherein said optical means includes a plurality of liquid-crystal cells, each having an electrically-controllable opaque field surrounding an aperature and each being positioned at a different location along the optical axis for selectively establishing an aperture at the location along said optical axis at which a cell is electrically controlled.

10. Apparatus as in claim 8 wherein said optical means includes a mirror selectably positionable between said lens means and said sensor means for effectively cyclically altering the distance through out-of-focus and in-focus distances to the surface that supplies radiation to the sensor means via the lens means and mirror.

11. Apparatus as in claim 10 comprising support means for said mirror disposed to alter a component of the position thereof along the optical axis in response to electrical signals applied thereto.

12. Apparatus as in claim 8 wherein said optical means includes an optical coupler having an output coupled to supply radiation therefrom to the radiation sensor means and having an input disposed to be cyclically positionable between two positions intermediate said lens means and said sensor for effectively cyclically altering the distance through out-of-focus and in-focus distances to the surface that supplies radiation to the sensor means through the lens means and optical coupler.

13. Apparatus as in claim 12 comprising drive means coupled to said optical coupler for selectably altering the position of the input thereof along said optical axis in response to electrical signal applied thereto.

14. Apparatus as in claim 8 wherein said optical means includes an aperture disposed to operatively alter a component of the position thereof along the optical axis relative to the position of the lens means such that the sensor means receives radiation from the surface that is effectively at varying distances including out of focus and in focus distances for a selected distance between the lens means and surface.

* * * * *